Aug. 28, 1928.

H. A. SELAH 1,682,194

CONTAINER COVER CONSTRUCTION

Filed Dec. 12, 1924

Inventor
Howard A. Selah

Patented Aug. 28, 1928.

1,682,194

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONTAINER-COVER CONSTRUCTION.

Application filed December 12, 1924. Serial No. 755,383.

This invention is particularly designed for covers for conduits. Such covers are ordinarily secured to the conduit boxes by screws. The covers are often put in place from difficult positions and it is desirable that the screws be retained in the cover so that the cover may be in position carrying the screws with it so that the screws without further placing on the part of the operator may be driven to place in the box. Features of the invention will appear from the specification and claim.

The invention is illustrated in the accompanying drawings as follows:—

Figure 1:
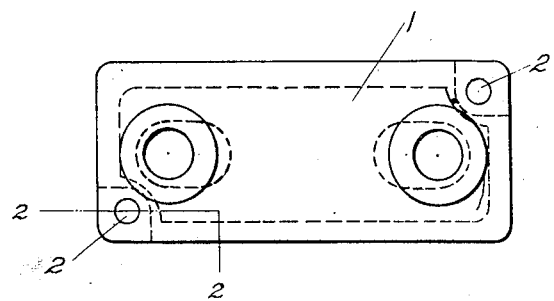

Fig. 1 shows a plan view of the cover.

Figure 2:
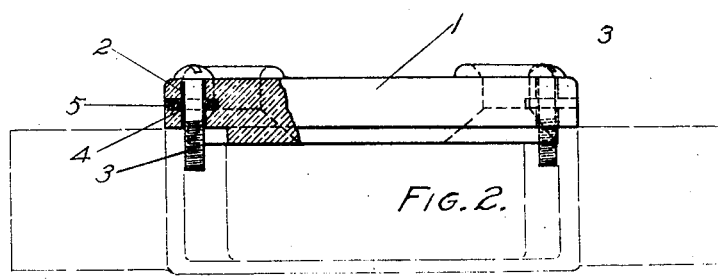

Fig. 2 a side elevation, partly in section, on the line 2—2 in Fig. 1.

Figure 3:
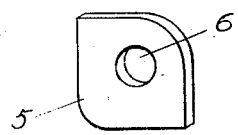

Fig. 3 a perspective view of the screw retaining plate.

1 marks the cover. A conduit box is shown in dash lines with the cover properly in place thereon.

The cover has the usual openings 2 for receiving the securing screws 3. The securing screws extend through the openings into the screw threaded openings in the box.

Transverse slots 4 are arranged in the cover and communicate with the openings 2 so that the screws passing through the openings also pass through the slots 4. Screw retaining plates 5, preferably of yielding material such as ordinary fibre stock, are arranged in the slots and these have perforations 6 which frictionally and yieldingly engage the screw so that the screw may be inserted through the opening and held in place by the plates so that when the cover is put in place the screws will be carried with the cover to position the screws so that they may be driven without further effort on the part of the operator. They also may serve the purpose of assembling the screws with the cover.

What I claim as new is:—

A container cover construction comprising a cover having an opening therethrough adapted to receive a securing screw and a transverse slot extending from the edge of the cover, said slot being of less width than the thickness of the cover providing a part of the cover wall above and below the slot; and a perforated plate in the slot with its perforation in line with the opening in the cover and adapted to retain a screw in the opening.

In testimony whereof I have hereunto set my hand.

HOWARD A. SELAH.